(12) United States Patent
Wadsted et al.

(10) Patent No.: US 11,526,567 B2
(45) Date of Patent: Dec. 13, 2022

(54) CONTEXTUALIZING SEARCHES IN A COLLABORATIVE SESSION

(71) Applicant: INTERNATIONAL BUSINESS MACHINES CORPORATION, Armonk, NY (US)

(72) Inventors: Jack Wadsted, Southampton (GB); Ashleigh Denholm, Southampton (GB); Emma J. Dawson, Eastleigh (GB); Eunjin Lee, Eastleigh (GB)

(73) Assignee: International Business Machines Corporation, Armonk, NY (US)

( * ) Notice: Subject to any disclaimer, the term of this patent is extended or adjusted under 35 U.S.C. 154(b) by 262 days.

(21) Appl. No.: 16/162,526

(22) Filed: Oct. 17, 2018

(65) Prior Publication Data

US 2020/0125679 A1    Apr. 23, 2020

(51) Int. Cl.
| | | |
|---|---|---|
| *G06F 16/9535* | (2019.01) | |
| *G06F 16/248* | (2019.01) | |
| *G06F 16/33* | (2019.01) | |
| *G06F 16/2457* | (2019.01) | |

(52) U.S. Cl.
CPC ........ *G06F 16/9535* (2019.01); *G06F 16/248* (2019.01); *G06F 16/24575* (2019.01); *G06F 16/3334* (2019.01)

(58) Field of Classification Search
CPC ............. G06F 16/9535; G06F 16/3334; G06F 16/24575; G06F 16/248
See application file for complete search history.

(56) References Cited

U.S. PATENT DOCUMENTS

| | | | |
|---|---|---|---|
| 6,327,590 B1 | 12/2001 | Chidlovskii et al. | |
| 6,895,406 B2 * | 5/2005 | Fables ................ | G06F 16/9535 |
| | | | 707/765 |
| 6,907,423 B2 * | 6/2005 | Weil ................... | G06F 16/9535 |
| (Continued) | | | |

OTHER PUBLICATIONS

Mell et al., "The NIST Definition of Cloud Computing", Recommendations of the National Institute of Standards and Technology, NIST Special Publication 800-145, Sep. 2011, 7 pages.

(Continued)

*Primary Examiner* — Miranda Le
(74) *Attorney, Agent, or Firm* — Elliot J. Shine

(57) ABSTRACT

A computer-implemented method, computer system, and computer program product for contextualizing searches in a collaborative session having two or more users. The method may include generating, by a processor, one or more keywords from user context sources of the collaborative session. Users engaged in the collaborative session may use computing devices interconnected with each other via a collaborative tool. The user context source may comprise a document, a file, a webpage, a search history, or an application. Context of the collaborative session, having a start and stop, may be established using a natural language processing system. The method may include adding one of the one or more keywords to the search string of one of the users participating in the collaborative session. In some embodiments, one user may be an expert user whose user context source may be the only user context source collected and analyzed during the collaborative session.

12 Claims, 6 Drawing Sheets

(56) References Cited

U.S. PATENT DOCUMENTS

| | | | | |
|---|---|---|---|---|
| 7,031,961 | B2* | 4/2006 | Pitkow | G06F 16/9562 |
| 7,822,738 | B2* | 10/2010 | Andersen | G06F 16/9535 |
| | | | | 707/713 |
| 8,095,523 | B2* | 1/2012 | Brave | G06F 16/9535 |
| | | | | 707/705 |
| 8,224,839 | B2* | 7/2012 | Krupka | G06F 3/167 |
| | | | | 707/765 |
| 8,296,302 | B2* | 10/2012 | Qiu | G06F 16/345 |
| | | | | 707/739 |
| 8,407,289 | B2* | 3/2013 | Chen | G06F 21/6218 |
| | | | | 709/205 |
| 8,452,798 | B2* | 5/2013 | Myaeng | G06F 16/3338 |
| | | | | 707/768 |
| 8,688,673 | B2* | 4/2014 | Sarkar | G06F 16/951 |
| | | | | 707/706 |
| 8,739,044 | B1* | 5/2014 | Varadarajan | G06F 3/0481 |
| | | | | 715/751 |
| 8,832,132 | B1 | 9/2014 | Spertus et al. | |
| 8,949,899 | B2* | 2/2015 | Errico | H04N 21/4667 |
| | | | | 725/46 |
| 8,954,431 | B2* | 2/2015 | Okazaki | G06F 3/0488 |
| | | | | 707/732 |
| 9,104,764 | B1* | 8/2015 | Garg | G06F 16/9574 |
| 9,165,305 | B1* | 10/2015 | Chandra | G06F 12/06 |
| 9,195,996 | B1* | 11/2015 | Walsh | H04L 51/32 |
| 9,300,718 | B2* | 3/2016 | Khanna | G10L 15/26 |
| 9,367,607 | B2 | 6/2016 | Vee et al. | |
| 9,519,716 | B2 | 12/2016 | Athsani et al. | |
| 9,553,842 | B1* | 1/2017 | Fisher | G06F 40/216 |
| 9,703,878 | B2 | 7/2017 | Pearcy | |
| 9,756,091 | B1* | 9/2017 | Davies | H04L 65/403 |
| 9,779,084 | B2* | 10/2017 | Danson | G06Q 50/205 |
| 10,459,985 | B2* | 10/2019 | Shepherd | H04L 65/403 |
| 2006/0129533 | A1 | 6/2006 | Purvis | |
| 2006/0288000 | A1* | 12/2006 | Gupta | G06F 16/9535 |
| 2007/0100804 | A1* | 5/2007 | Cava | G06F 16/3322 |
| 2008/0016053 | A1* | 1/2008 | Frieden | G06F 16/951 |
| 2008/0201434 | A1* | 8/2008 | Holmes | G06F 16/951 |
| | | | | 709/206 |
| 2008/0250333 | A1* | 10/2008 | Reeves | G06F 3/0483 |
| | | | | 715/753 |
| 2009/0164929 | A1 | 6/2009 | Chen et al. | |
| 2011/0208771 | A1* | 8/2011 | Milou | G06F 16/951 |
| | | | | 707/769 |
| 2012/0317108 | A1* | 12/2012 | Okazaki | G06F 3/04815 |
| | | | | 707/732 |
| 2013/0173569 | A1* | 7/2013 | Pearcy | G06F 16/9535 |
| | | | | 707/706 |
| 2014/0033049 | A1* | 1/2014 | Fitzpatrick | G06F 16/954 |
| | | | | 715/733 |
| 2015/0100503 | A1* | 4/2015 | Lobo | G06Q 10/103 |
| | | | | 705/301 |
| 2016/0063093 | A1* | 3/2016 | Boucher | G06F 16/90324 |
| | | | | 707/748 |
| 2016/0070777 | A1* | 3/2016 | Lubeck | G06F 16/9537 |
| | | | | 707/740 |
| 2016/0099984 | A1* | 4/2016 | Karagiannis | H04L 65/1083 |
| | | | | 709/206 |
| 2016/0140230 | A1* | 5/2016 | Villeneuve | G06F 16/951 |
| | | | | 707/706 |
| 2018/0268072 | A1* | 9/2018 | Rathod | G06F 16/9535 |

OTHER PUBLICATIONS

Uppuluri et al., "A Collaborative Filtering based Re-ranking Strategy for Search in Digital Libraries", Digital Libraries Implementing Strategies and Sharing Experiences, ICADL 2005, Lecture Notes in Computer Science, vol. 3815, pp. 194-203.

Uppuluri et al., "Improving Re-ranking of Search Results using Collaborative Filtering", American Association for Artificial Intelligence, © 2002, 7 pages.

IBM, "Natural Language Understanding", Watson, printed Jul. 31, 2018, 11 pages, https://www.ibm.com/watson/services/natural-language-understanding/.

* cited by examiner

CONTEXTUALIZING SEARCHES IN A COLLABORATIVE SESSION

BACKGROUND

The present invention relates generally to a method, system and computer program for contextualizing searches in a collaborative session.

In a work or educational setting, a group of individuals such as a work team or students and teachers may collaborate and interact. The individuals may all be located together, or they may be located at a variety of different locations. In either case, the individuals may employ a collaborative tool installed on a computing or communication device to enhance the session. For example, during a collaborative session, the group may use one or more collaborative tools such as Zoom, WebEx, SMS, Verse, Box, Sametime, or a conference telephone call. In addition, during a collaborative session, one or more individuals in the group may perform a search to obtain information that may be of use during the session. A variety of internet search engines are available to provide users with search results based on search strings the users entered.

BRIEF SUMMARY

An embodiment of the present invention may include a computer-implemented method, computer system, and computer program product for contextualizing searches in a collaborative session having two or more users. The method may include generating, by a processor, one or more keywords from one or more user context source of the collaborative session. The users engaged in the collaborative session may use computing devices which may be interconnected with each other via a collaborative tool. The user context source may comprise a document, a file, a webpage, a search history, or an application. The method may include analyzing data from one or more user context sources using a natural language processing system. The collaborative session may have a defined start and stop. The method may include adding one of the one or more keywords to a search string of one of the users of the collaborative session.

In some embodiments, at least one user may be an expert user whose user context source may be the only user context source collected and analyzed during the collaborative session. In some embodiments, at least one user may be an expert user whose context source may be multiplied by a weighing factor when the user context source is analyzed. In various embodiments, the adding of one of the one or more keywords is in response to a user selection.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. The drawings are discussed forthwith below.

DETAILED DESCRIPTION

Figure 1:
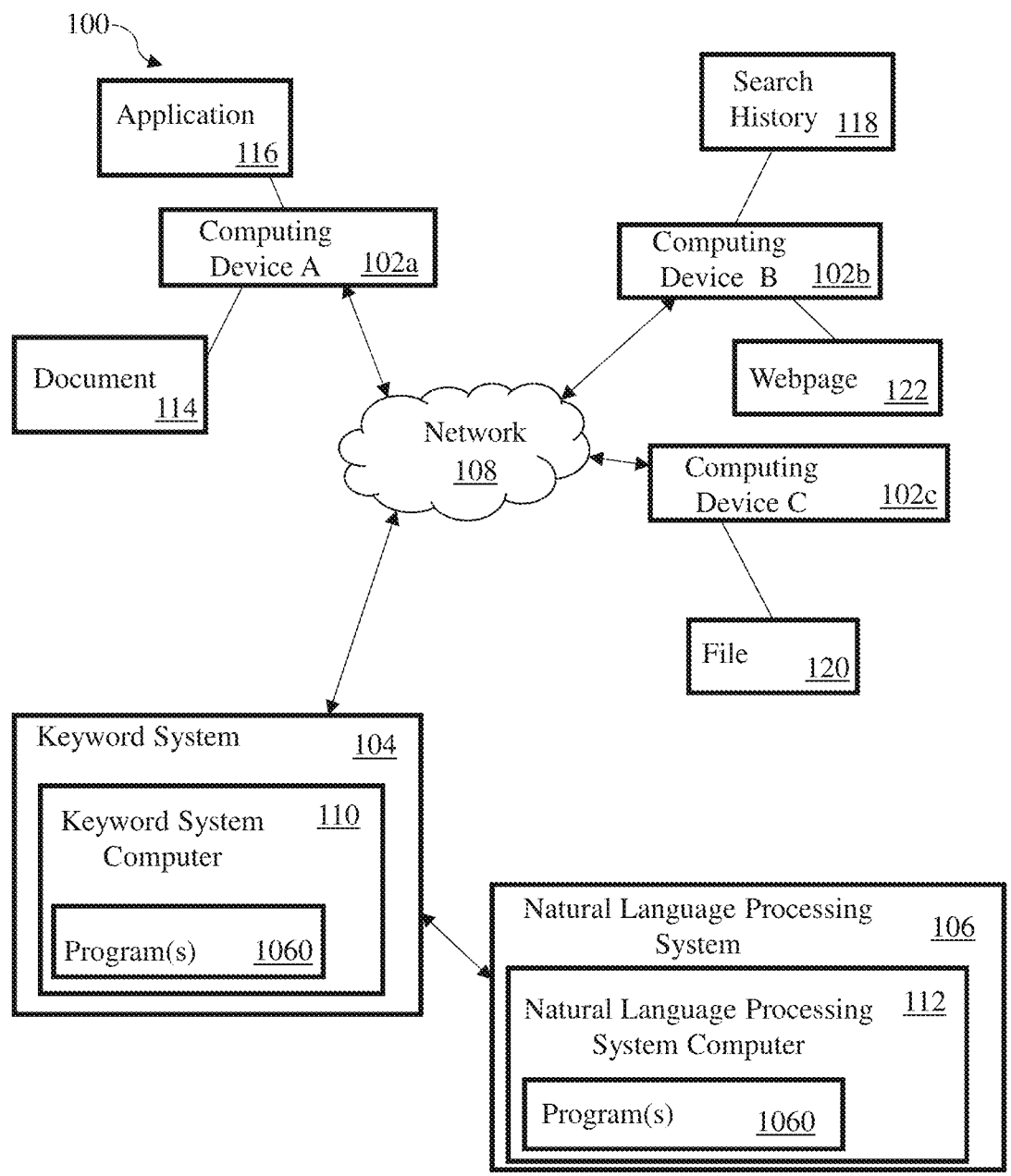
FIG. 1 is a schematic block diagram illustrating a system for contextualizing searches in a collaborative session, in accordance with an embodiment of the invention.

Embodiments of the present invention will now be described in detail with reference to the accompanying Figures.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

Embodiments of the present invention provide a method, computer program, and computer system for contextualizing searches in a collaborative session. Currently, internet search engines provide users with search results based on search strings the users entered. However, oftentimes the search strings generate inaccurate results. For example, a user is searching for an ajax table as it relates to programming. When the user types in "ajax table" in the search engine, the results relate to the Dutch football team Ajax and its football league table. In such an instance, the user would prefer to get search results on an ajax table as it relates to programming.

In an embodiment of the present invention, users who are working together in a collaborative session are identified. The collaborative session may be conducted via networked computers. Once a collaborative session is established, the context of said session is determined, and a keyword or a plurality of keywords are generated and ranked according to their relevance. The keyword or a plurality of keywords is then automatically added to future searches of all the users in the collaborative session. Alternatively, the users may manually determine and select the most relevant keyword or a plurality of keywords to add to the search string. In an embodiment of the present invention, the users may reject a keyword or a plurality of keywords that the use determines is not relevant to the search.

Establishing a collaborative session and determining the context of said session may alleviate many problems with conducting internet searches. Oftentimes, users do not know what words to type into a search engine to generate the results they want. For example, when a collaborative session is established between users from different disciplines, users that are experts in the field in which the search is being conducted will have vast knowledge of the subject. Conversely, users that are experts in one field may be novices in the field in which the search is being conducted will not know which words to search for. Embodiments of the present invention utilize a natural language processing system to determine the context of the collaborative session and to generate a relevant keyword or a plurality of keywords for use as an additional search term. This keyword is then added to subsequent search strings of all users in the collaborative session. This may provide a user who may not be an expert in all disciplines relevant to the collaboration session to obtain more focused and relevant search results than would be obtained with solely with a search term or search string input by the user.

Another problem with conducting internet searches is that each search uses computing resources. When a user is conducting an internet search, the user types in a search string that may not necessarily yield accurate results. The user then conducts many more searches before the correct results are found. As a result, the more time a user spends conducting searches, the more computer processing unit (CPU) cycles of a computing device the user will use. In addition, search queries and responses are typically transmitted over a network. Reducing the number of searches reduces network traffic.

Accordingly, an embodiment of the present invention provides a technical solution to the problems described above with respect to computing devices and networks. Specifically, embodiments of the present invention utilize a natural language processing system that analyzes documents, folders, prior internet search strings, etc. of all the users in a collaborative session to generate a keyword or a list of keywords that may be used in a future search. Since the generated keyword relates to the task the users in the collaborative session are working on, the search results may be more accurate. This in turn allows for fewer searches because utilizing the keyword generally provides search results that are more relevant than search results obtained without the keyword. Therefore, CPU usage of the computing device may be lowered allowing for the computing device to operate with high efficiency.

Reference will now be made in detail to the embodiments of the present invention, examples of which are illustrated in the accompanying drawings, wherein like reference numerals refer to like elements throughout. Embodiments of the invention are generally directed to contextualizing searches in a collaborative session.

In an embodiment of the present invention, a computing device is a laptop computer but is not limited to such. Other examples include user's tablet, desktop computer, smartphone, or any programmable electronic device supporting the functionality required by one or more embodiments of the invention.

Various embodiments may include a natural language processing systems, products, and techniques, which may include, for example, the IBM Watson Natural Language Understanding product. Other natural language processing systems, products, and techniques may include, but are not limited to, Naïve Bayes classifiers, support vector machines, artificial neural networks, or any natural language processing system, product, or technique supporting the functionality required by one or more embodiments of the invention. Embodiments may include calls to a number of application program interfaces (APIs) to analyze collected data, and generate and rank keywords based on the data analysis. One embodiment can use IBM Watson® APIs for analyzing and determining meaning of text. Another embodiment can use IBM Watson® APIs for converting speech to text. Yet another embodiment can use IBM Watson® APIs for analyzing and determining meaning of an image.

FIG. 1 illustrates a system 100 for contextualizing searches in a collaborative session, in accordance with an embodiment of the present invention. In an example embodiment, system 100 may include a plurality of computing devices 102a, 102b, 102c, a keyword system 104, a natural language processing system 106, all connected via one or more networks 108. Although FIG. 1 shows three computing devices, computing device A, computing device B and computing device C, principles of an embodiment of the present invention are not restricted to three computing devices and may be used with at least two computing devices. The computing device 102 may be an instance of the computer 1010 shown in FIG. 4.

The keyword system 104 comprises a keyword system computer 110. The natural language processing system 106 comprises a natural language processing system computer 112. The keyword system 104 and the natural language processing system 106 may comprise program(s) 1060.

In an example embodiment, each computing device 102 may have at least one of a document 114, an application 116, a search history 118, a file 120, or a webpage 122 opened, which may be collectively referred to as "user context sources." The webpage 122 may be a page opened during the session or within another user-specified time period. A chat history or a transcript of the collaborative session may also be a user context source.

While it is preferable that each computing device 102 have a plurality of user context sources for an associated user determined to be a member of a collaborative session, it is not required that a particular computing device 102 associated with a particular user have any available user context sources. For example, users A, B, and C may be determined to be members of a collaborative session. A and B may each have one or more user context sources, while user C has no user context sources.

Figure 2:
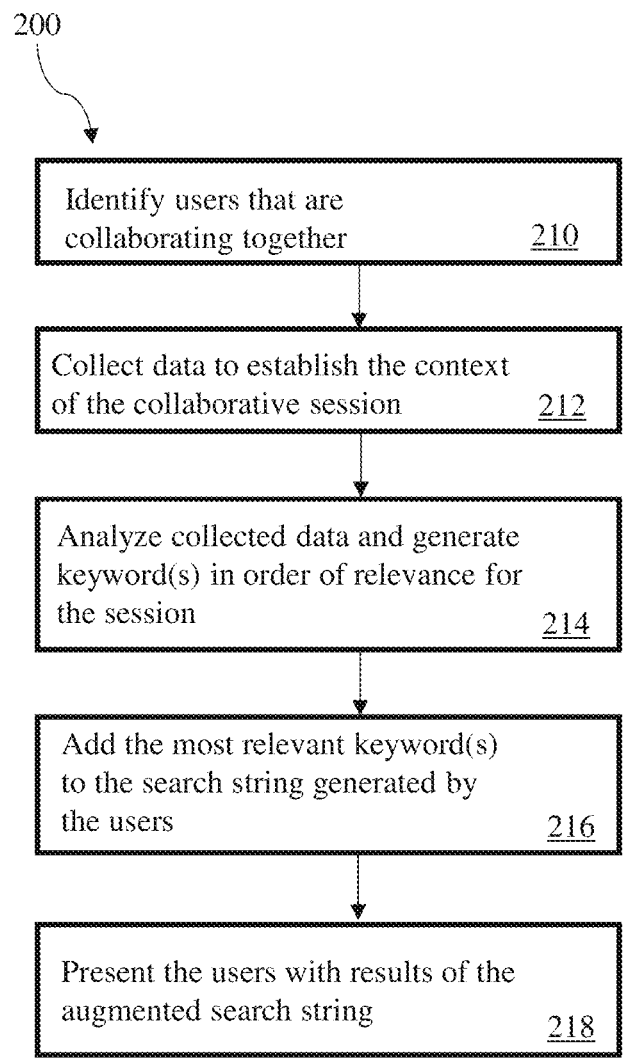
FIG. 2 is a flow chart illustrating an example method for contextualizing searches in a collaborative session, in accordance with an embodiment of the invention.

Referring to FIG. 2, a method 200 for contextualizing searches in a collaborative session is depicted, in accordance with an embodiment of the present invention. The method 200 is described with respect to three computing devices 102, as depicted in FIG. 1. It should be appreciated that the method 200 may be employed with two or more computing devices 102.

Referring to block 210, the method 200 identifies the users and their respective computing devices 102 that are collaborating together. The identification of users who are collaborating together may be accomplished through the use of collaborative tools. For example, users may establish a collaborative session with each other by joining the same Google Classroom or participating in text, voice or video chats using Google Hangouts.

Identifying a collaborative session may be done through the use of other collaborative tools. These tools may include, but are not limited to, Zoom, WebEx, SMS, conference telephone calls, Verse, Box, or Sametime. In an embodiment of the present invention, the collaborative tools may be interconnected among the users and their respective computing devices 102.

In an embodiment of the present invention, the collaborative session has a defined start and finish. Further, each collaborative session may be self-encapsulated so that one session may finish before a new session may be established. For example, a collaborative session may be established when at least two users join a Google Classroom, participate in a Google Hangouts session, or utilize any of the available collaborative tools. A collaborative session may finish when either all, or all but one users have left the Google Classroom, the Google Hangouts session, or a session using another collaborative tool.

In another example, users A and B join the same Google Classroom, thus establishing the beginning of a collaborative session. Within the next thirty minutes, users C, D, and E also join the same Google Classroom. At this time, users A, B, C, D, and E are all joined in an established collaborative session. During the collaborative session, users A, B, and D log out of the Google Classroom early, however users C and E are still logged on. At this time, the collaborative session does not end because there are still at least two users logged onto the session. However, if one of the users, either user C or user E, leaves the Google Classroom, the collaborative session ends.

Referring to block 212, the method 200 establishes the context of the collaborative session. The context of the collaborative session may be established using a natural language processing system 106. The natural language processing system computer 112 may collect the user context sources for all of the users that may be collaborating together in an established collaborative session. The natural language processing system computer 112 may collect the user context sources, such as a document 114, an application 116, a search history 118, a file 120, a webpage 122, or any other source capable of being collected.

In order to collect the user context sources, the natural language processing system computer 112 may communicate with each computing device 102 and analyze which user context sources are open. In an embodiment of the present invention, the natural language processing system computer 112 may be configured, by the user, to identify the type of user context sources it may collect and analyze. For example, the natural language processing system computer 112 may be configured to identify the format of the user context sources, such as, for documents ".docx," ".pdf," ".html," ".xls," ".ppt." The natural language processing system computer 112 may be configured to identify any other format that the user context source may be identified by. In addition, the natural language processing system computer 112 may interact with each computing device 102 to learn what applications each user has open on their computing device 102 and to learn what websites a web browser on the user's computing device 102 has visited. Further, if an application, for example an email or a chat application, allowed a user to enter text, the natural language processing system computer 112 may copy the user text in the application files. In addition, the natural language processing system computer 112 may interrogate the file system of each user's computing device 102 to identify documents and files containing natural language. The natural language contained in the visited user context sources may then be analyzed to determine keywords.

In some embodiments, user context sources may be collected for a subset of the users of a collaborative session. For example, users of the collaborative session may designate certain users as expert users. The context sources of these expert users may be the only context sources collected and analyzed.

In alternative embodiments of the present invention, the context sources for all users, experts and non-experts, of the collaborative session may be collected and analyzed. However, because the analysis of the context sources of the expert users may generate keywords that are more relevant to the topic of the collaborative session, their context sources may be more heavily weighted. For example, user A, user B, and user C are joined in a collaborative session that pertains to biology. User A, who set up the collaborative session using Google Classroom, designates user B as the expert because user B holds a PhD in biology. During the collaborative session, each user has user context sources. However, user B's context sources will be given greater value because user B is designated as an expert. When the natural language processing system computer 112 analyzes all of the user context sources, user B's context sources are multiplied, for example, by a weighing factor of 2. The weighing factor may be configurable at any time or predefined by the user. This allows for user B's context sources to provide more relevance to the generated keywords.

Once collected, the natural language processing system computer 112 analyzes the user context sources and generates, at block 214, a keyword or a plurality of keywords associated with the user context sources.

The keyword system 104 may use the keyword system computer 110 to sort the generated keyword or a plurality of keywords by relevance. Each keyword may be assigned a relevance number, with a score of 1.0 assigned to the most relevant keyword and a score of 0.0 assigned to the least relevant keyword. In an embodiment, a relevance value for a term is proportional to a frequency at which the term appears in user context sources. Relevance of the keyword or the plurality of keywords may be dictated by, but is not limited to, the frequency of appearance in the user context sources. For example, Watson Natural Language Understanding may be used as a natural language processing system 106 to generate a keyword or a plurality of keywords for any given collaborative session. The natural language processing system 106 is not limited to Watson Natural Language Understanding and may include Microsoft's Language Understanding Intelligence Service, Google Natural Language API, Wit.ai, Api.ai, or any natural language processing system supporting the functionality required by one or more embodiments of the invention.

In an embodiment of the present invention, Watson Natural Language Understanding may analyze the user context sources and generate attributes of text such as sentiment, emotion, entities, categories, concepts, keywords, or semantic roles. The users may program Watson Natural Language Understanding to generate attributes of text pertaining to keywords only. In such a case, Watson Natural Language Understanding may analyze the user context sources, generate keywords and sort the keywords according to relevancy. The most relevant keyword may be the keyword with the highest frequency of appearance.

In an alternative embodiment of the present invention, users may program Watson Natural Language Understanding to provide information pertaining to a different combination of the attributes of text. For example, users may want Watson Natural Language Understanding to provide the most relevant concepts or categories that appear in the user context sources. With each combination of the attributes of text, Watson Natural Language Understanding will sort the generated keywords, for each attribute, according to its relevance. Thus, the users may receive the most relevant keywords, irrespective of which attribute of text they choose.

According to various embodiments, the natural language processing system 106 may be employed, for example, to determine from the user context sources: a topic or subject of the context sources, categories to which the user context sources may belong to, or concepts associated with the user context sources. The natural language processing system 106 may analyze the user context sources in any number of natural languages. Further, the natural language processing system 106 may include various modules to analyze the user context sources from different social networking systems or other received electronic communication content to identify characteristics about the user context sources. The natural language processing system 106 may analyze the user context sources that include images, such as graphical, schematic, tabular, and other images representing data or other information.

Once the generated keywords are sorted by relevance, one or more of the most relevant keywords may be added to a subsequent search string generated by any of the users collaborating together, as is shown at block 216. The most relevant keyword may be added to the subsequent search strings of all the users in that particular collaborative session. The search strings may be input to any known search engine, such as Google, Bing, Baidu, or Yahoo. At block 218, the users are presented with the results of the augmented search string.

The most relevant keyword may be automatically added to a search string generated by the user. For example, users A and B are engaged in a collaborative session. Embodiments of the present invention generate and sort keywords associated with that collaborative session according to the keywords' relevance. Users A and B decide to conduct another search on the given topic of the collaborative session and type in their respective search strings into their search engines. According to various embodiments of the present invention, user A and B's search strings are automatically augmented by adding one or more of the most relevant keywords to said search strings. As a result of the keyword being added to each user's search string, users A and B may be able to receive search results that are more relevant to a topic of the collaborative session.

In an alternative embodiment of the present invention, the generated keywords are not automatically added to the subsequent search string. Rather, the alternative embodiment of the present invention suggests, to the users, the most relevant keywords and the users themselves decide to either add the suggested keyword to the subsequent search string, or to discard the keyword as not relevant to the context of the collaborative session.

Further, users engaged in a collaborative session may have the capability of setting a keyword relevance threshold which allows for displaying of keywords that surpass the threshold. For example, users may set a relevance scale from zero, as the least relevant, to 1, as the most relevant. Based on this relevance scale, users may decide that any keywords with a relevance number of less than 0.5 should not be displayed. As a result, the keyword system computer 110 will display keywords with relevance numbers of 0.5 and higher, with the keyword with the score of 1 as the most relevant keyword.

Embodiments of the present invention may also have the capability of learning from user rejections of keywords or search results. For example, when the present invention suggests a relevant keyword to the user, and the user rejects the keyword or a search result in which the keyword was used as a search term, the present invention may either eliminate the keyword from a keyword list or lower the relevance of the keyword, but not eliminate it from the keyword list. If the relevance of the keyword is lowered, the present invention may not suggest the keyword subsequently during that collaborative session in some embodiments. In other embodiments, a keyword having been rejected by a user may be suggested for use in a subsequent search if the natural language processing system computer 112 determines that the scope of the previous search has changed and the rejected keyword may be relevant again.

Embodiments of the present invention allow for the natural language processing system computer 112 to analyze user context sources to generate a keyword based on related words. For example, during a collaborative session, the natural language processing system computer 112 analyzes user context sources where words such as skin, bones, and humans have a high frequency of appearance. The natural language processing system computer 112 may analyze these related terms and determine that the common denominator for all of these related terms is the keyword "biology". Accordingly, in various embodiments, words found in user context sources are used to infer a topic, subject, category, or concept, and a keyword may be derived from the inferred topic, subject, category, or concept. In an embodiment, a relevance value for a keyword derived from an inferred topic, subject, category, or concept may be proportional to a frequency at which the underlying terms used to form the inference appear in user context sources.

Figure 3:
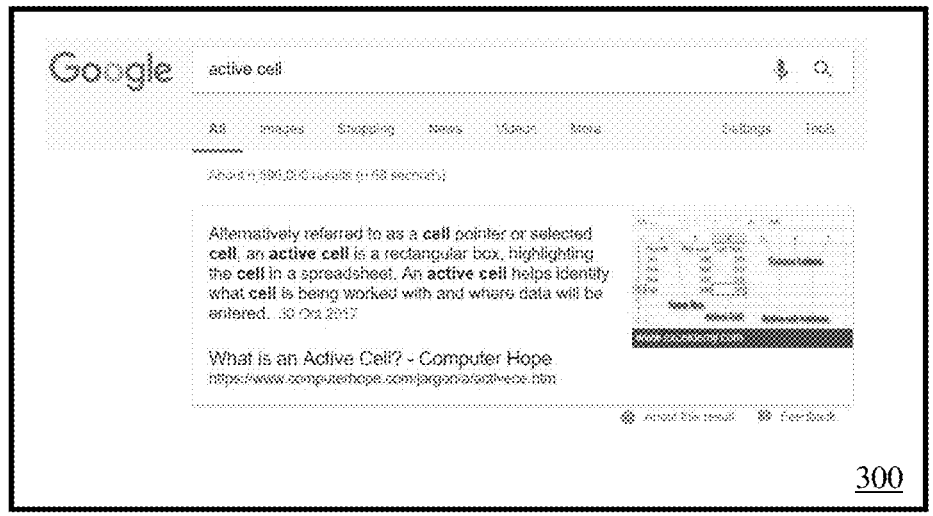
FIG. 3 is a schematic block diagram illustrating search strings and their respective search results, in accordance with an embodiment of the invention.
Figure 3:
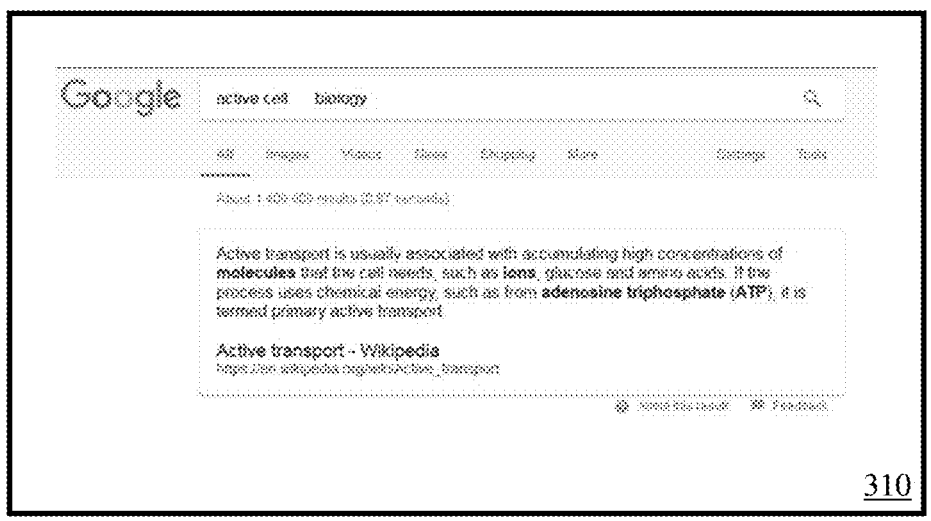

The method 200 to contextualize searches in a collaborative session, as illustrated in FIG. 2 in accordance with an embodiment of the present invention, may be more apparent in the following example. For example, users A, B, and C are in a collaborative session together, using Google Classroom. Each user may have different user context sources opened. For example, user A may have a file 120, titled Biology, opened. User B may have a document 114 pertaining to cell biology opened. User C may have conducted a search on "active cell" as illustrated in FIG. 3, block 300. The users may be collaborating on a project that pertains to active cells in biology. However, as illustrated at block 300, when user C conducted a search on an active cell, the search generated results pertaining to Excel spreadsheets, not biology. In order for the search to generate search results that are relevant or applicable or pertinent to a particular subject or matter applicable to a user, an embodiment of the present invention utilizes a natural language processing system 106 to analyze each user's context sources to generate a keyword, or a plurality of keywords, that is most relevant to the collaborative session. In this example, the natural language processing system 106 generates "biology" as the most relevant keyword. An embodiment of the present invention appends the keyword "biology" to a subsequent search string, as shown in block 310, to generate most relevant search results.

Figure 4:
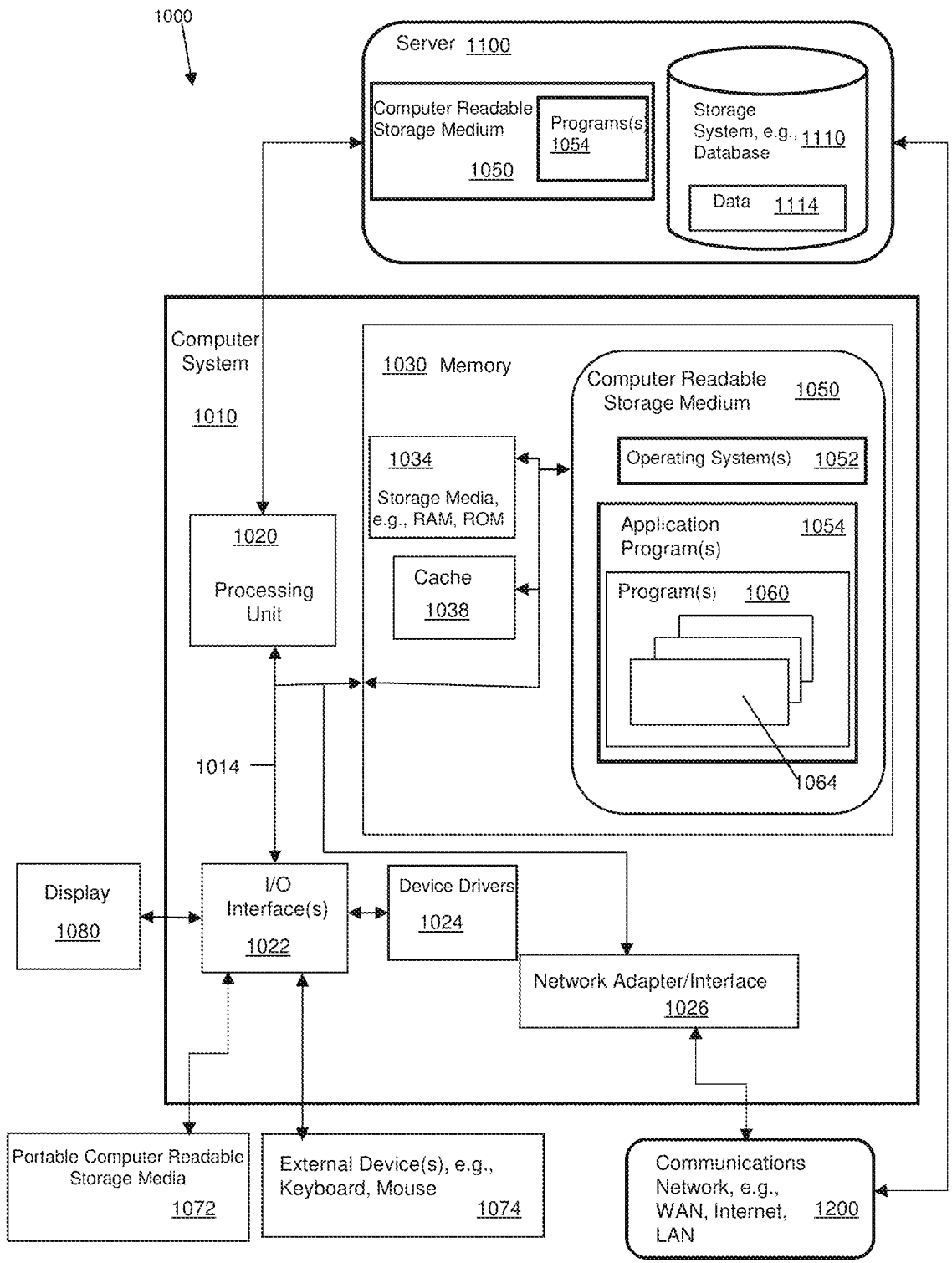
FIG. 4 is a block diagram depicting the hardware components of a system for contextualizing searches in a collaborative session, in accordance with an embodiment of the invention.
Figure 5:
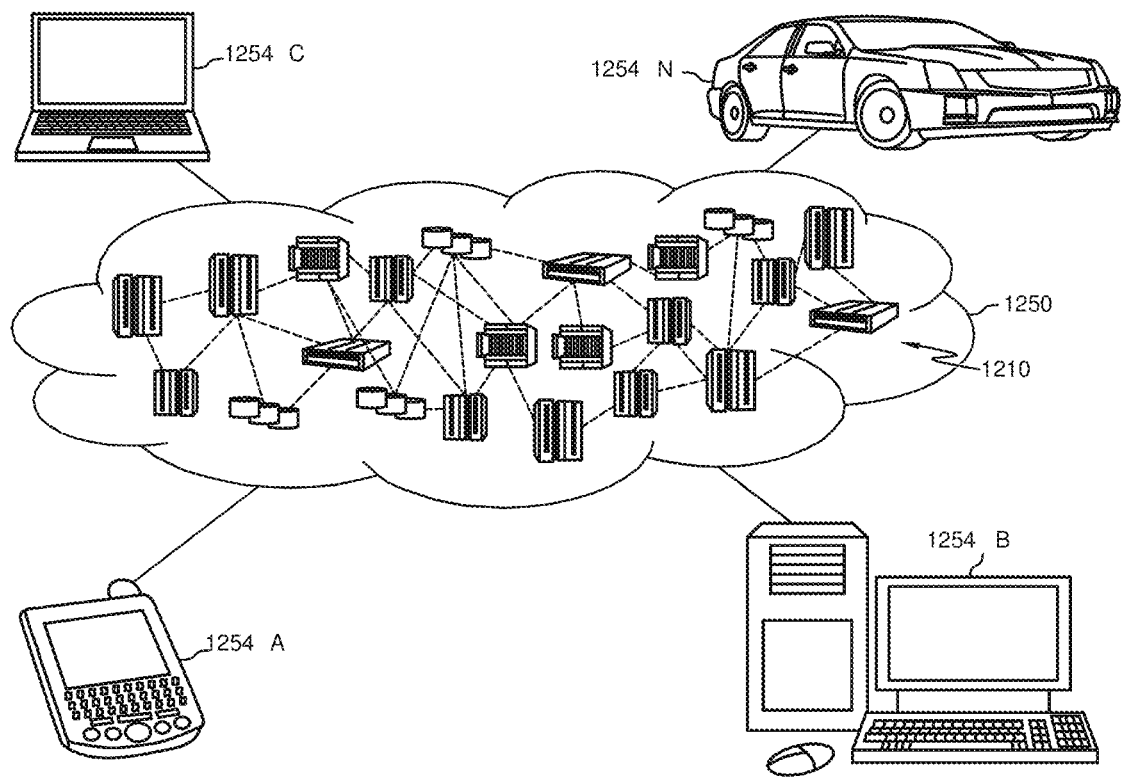
FIG. 5 is a functional block diagram depicting a cloud computing environment, in accordance with an embodiment of the invention.
Figure 6:
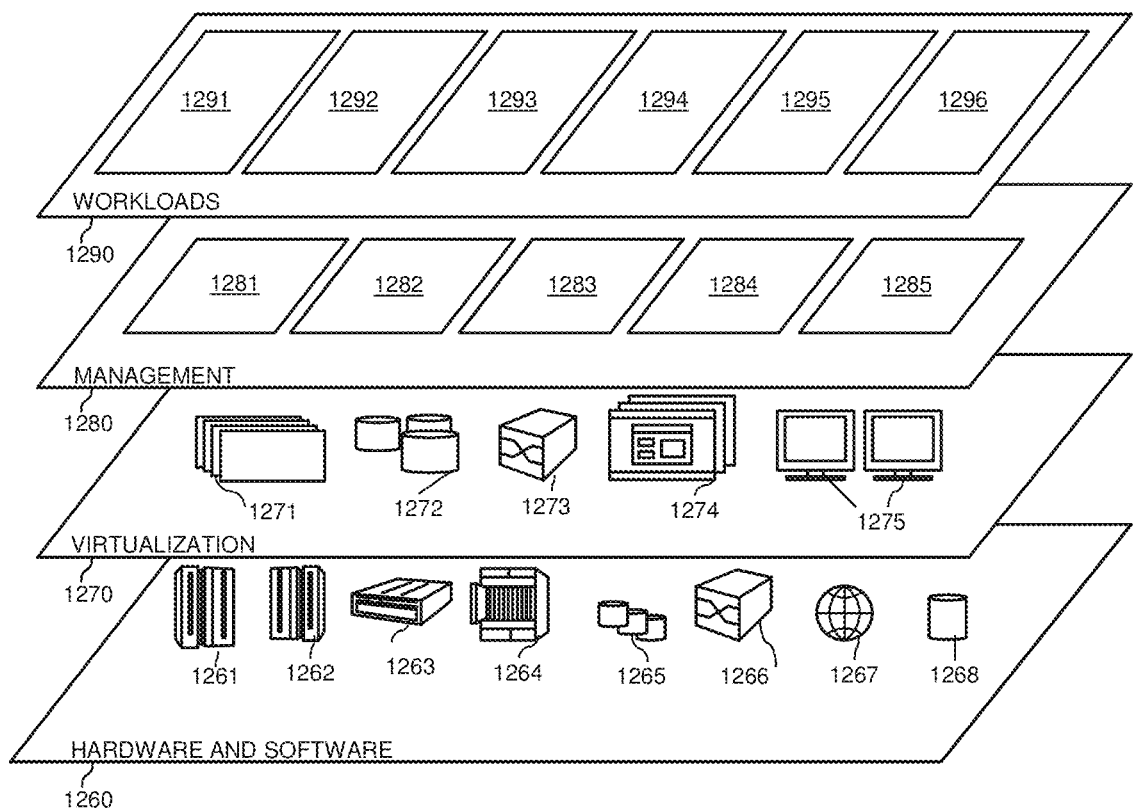
FIG. 6 is a diagram depicting abstraction model layers provided by the cloud computing environment of FIG. 5, in accordance with an embodiment of the invention.

The computing device 102, the keyword system 104 and natural language processing system 106 may include internal and external hardware components, as described in further detail below with respect to FIG. 4. It should be appreciated that FIG. 4 provides only an illustration of one implementation and does not imply any limitations with regard to the environments in which different embodiments may be implemented. Many modifications to the depicted environment may be made. In other embodiments, the computing device 102, the keyword system 104 and natural language processing system 106 may operate in a cloud computing environment, as depicted in FIGS. 5 and 6.

Referring to FIG. 4, a system 1000 includes a computer system or computer 1010 shown in the form of a generic computing device. The method 200, for example, may be embodied in a program(s) 1060 (FIG. 4) embodied on a computer readable storage device, for example, generally referred to as memory 1030 and more specifically, computer readable storage medium 1050 as shown in FIG. 4. For example, memory 1030 can include storage media 1034 such as RAM (Random Access Memory) or ROM (Read Only Memory), and cache memory 1038. The program 1060 is executable by the processing unit or processor 1020 of the computer system 1010 (to execute program steps, code, or program code). Additional data storage may also be embodied as a database 1110 which can include data 1114. The computer system 1010 and the program 1060 shown in FIG. 5 are generic representations of a computer and program that may be local to a user, or provided as a remote service (for example, as a cloud based service), and may be provided in further examples, using a website accessible using the communications network 1200 (e.g., interacting with a network, the Internet, or cloud services). It is understood that the computer system 1010 also generically represents herein a computer device or a computer included in a device, such as a laptop or desktop computer, etc., or one or more servers, alone or as part of a datacenter. The computer system can include a network adapter/interface 1026, and an input/output (I/O) interface(s) 1022. The I/O interface 1022 allows for input and output of data with an external device 1074 that may be connected to the computer system. The network adapter/interface 1026 may provide communications between the computer system a network generically shown as the communications network 1200.

The computer 1010 may be described in the general context of computer system-executable instructions, such as program modules, being executed by a computer system. Generally, program modules may include routines, programs, objects, components, logic, data structures, and so on that perform particular tasks or implement particular abstract data types. The method steps and system components and techniques may be embodied in modules of the program 1060 for performing the tasks of each of the steps of the method and system. The modules are generically represented in FIG. 4 as program modules 1064. The program 1060 and program modules 1064 can execute specific steps, routines, sub-routines, instructions or code, of the program.

Embodiments of the present disclosure can be run locally on a device such as a mobile device, or can be run a service, for instance, on the server 1100 which may be remote and can be accessed using the communications network 1200. The program or executable instructions may also be offered as a service by a provider. The computer 1010 may be practiced in a distributed cloud computing environment where tasks are performed by remote processing devices that are linked through a communications network 1200. In a distributed cloud computing environment, program modules may be located in both local and remote computer system storage media including memory storage devices.

More specifically, as shown in FIG. 4, the system 1000 includes the computer system 1010 shown in the form of a general-purpose computing device with illustrative periphery devices. The components of the computer system 1010 may include, but are not limited to, one or more processors or processing units 1020, a system memory 1030, and a bus 1014 that couples various system components including system memory 1030 to processor 1020.

The bus 1014 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer 1010 can include a variety of computer readable media. Such media may be any available media that is accessible by the computer 1010 (e.g., computer system, or server), and can include both volatile and non-volatile media, as well as, removable and non-removable media. Computer memory 1030 can include additional computer readable media 1034 in the form of volatile memory, such as random access memory (RAM), and/or cache memory 1038. The computer 1010 may further include other removable/non-removable, volatile/non-volatile computer storage media, in one example, portable computer readable storage media 1072. In one embodiment, the computer readable storage medium 1050 can be provided for reading from and writing to a non-removable, non-volatile magnetic media. The computer readable storage medium 1050 can be embodied, for example, as a hard drive. Additional memory and data storage can be provided, for example, as the storage system 1110 (e.g., a database) for storing data 1114 and communicating with the processing unit 1020. The database can be stored on or be part of a server 1100. Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1014 by one or more data media interfaces. As will be further depicted and described below, memory 1030 may include at least one program product which can include one or more program modules that are configured to carry out the functions of embodiments of the present invention.

The method 200 (FIG. 2), for example, may be embodied in one or more computer programs, generically referred to as a program 1060 and can be stored in memory 1030 in the computer readable storage medium 1050. The program 1060 can include program modules 1064. The program modules 1064 can generally carry out functions and/or methodologies of embodiments of the invention as described herein. The program 1060 may be the keyword system 104 or the natural language processing system 106. The one or more programs 1060 are stored in memory 1030 and are executable by the processing unit 1020. By way of example, the memory 1030 may store an operating system 1052, one or more application programs 1054, other program modules, and program data on the computer readable storage medium 1050. It is understood that the program 1060, and the operating system 1052 and the application program(s) 1054 stored on the computer readable storage medium 1050 are similarly executable by the processing unit 1020.

The computer 1010 may also communicate with one or more external devices 1074 such as a keyboard, a pointing device, a display 1080, etc.; one or more devices that enable a user to interact with the computer 1010; and/or any devices (e.g., network card, modem, etc.) that enables the computer 1010 to communicate with one or more other computing devices. Such communication can occur via the Input/Output (I/O) interfaces 1022. Still yet, the computer 1010 can communicate with one or more networks 1200 such as a local area network (LAN), a general wide area network (WAN), and/or a public network (e.g., the Internet) via network adapter/interface 1026. As depicted, network adapter 1026 communicates with the other components of the computer 1010 via bus 1014. It should be understood that although not shown, other hardware and/or software components could be used in conjunction with the computer 1010. Examples, include, but are not limited to: microcode, device drivers 1024, redundant processing units, external disk drive arrays, RAID systems, tape drives, and data archival storage systems, etc.

It is understood that a computer or a program running on the computer 1010 may communicate with a server, embodied as the server 1100, via one or more communications networks, embodied as the communications network 1200. The communications network 1200 may include transmission media and network links which include, for example, wireless, wired, or optical fiber, and routers, firewalls, switches, and gateway computers. The communications network may include connections, such as wire, wireless communication links, or fiber optic cables. A communications network may represent a worldwide collection of networks and gateways, such as the Internet, that use various protocols to communicate with one another, such as Lightweight Directory Access Protocol (LDAP), Transport Control Protocol/Internet Protocol (TCP/IP), Hypertext Transport Protocol (HTTP), Wireless Application Protocol (WAP), etc. A network may also include a number of different types of networks, such as, for example, an intranet, a local area network (LAN), or a wide area network (WAN).

In one example, a computer can use a network which may access a website on the Web (World Wide Web) using the Internet. In one embodiment, a computer 1010, including a mobile device, can use a communications system or network 1200 which can include the Internet, or a public switched telephone network (PSTN) for example, a cellular network. The PSTN may include telephone lines, fiber optic cables, microwave transmission links, cellular networks, and communications satellites. The Internet may facilitate numerous searching and texting techniques, for example, using a cell phone or laptop computer to send queries to search engines via text messages (SMS), Multimedia Messaging Service (MMS) (related to SMS), email, or a web browser. The search engine can retrieve search results, that is, links to websites, documents, or other downloadable data that correspond to the query, and similarly, provide the search results to the user via the device as, for example, a web page of search results.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 5, illustrative cloud computing environment 1250 is depicted. As shown, cloud computing environment 1250 includes one or more cloud computing nodes 1210 with which local computing devices used by cloud consumers, such as, for example, personal digital assistant (PDA) or cellular telephone 1254A, desktop computer 1254B, laptop computer 1254C, and/or automobile computer system 1254N may communicate. Nodes 1210 may communicate with one another. They may be grouped (not shown) physically or virtually, in one or more networks, such as Private, Community, Public, or Hybrid clouds as described hereinabove, or a combination thereof. This allows cloud computing environment 1250 to offer infrastructure, platforms and/or software as services for which a cloud consumer does not need to maintain resources on a local computing device. It is understood that the types of computing devices 1254A-N shown in FIG. 5 are intended to be illustrative only and that computing nodes 1210 and cloud computing environment 1250 can communicate with any type of computerized device over any type of network and/or network addressable connection (e.g., using a web browser).

Referring now to FIG. 6, a set of functional abstraction layers provided by cloud computing environment 1250 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 1260 includes hardware and software components. Examples of hardware components include: mainframes 1261; RISC (Reduced Instruction Set Computer) architecture based servers 1262; servers 1263; blade servers 1264; storage devices 1265; and networks and networking components 1266. In some embodiments, software components include network application server software 1267 and database software 1268.

Virtualization layer 1270 provides an abstraction layer from which the following examples of virtual entities may be provided: virtual servers 1271; virtual storage 1272; virtual networks 1273, including virtual private networks; virtual applications and operating systems 1274; and virtual clients 1275.

In one example, management layer 1280 may provide the functions described below. Resource provisioning 1281 provides dynamic procurement of computing resources and other resources that are utilized to perform tasks within the cloud computing environment. Metering and Pricing 1282 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1283 provides access to the cloud computing environment for consumers and system administrators. Service level management 1284 provides cloud computing resource allocation and management such that required service levels are met. Service Level Agreement (SLA) planning and fulfillment 1285 provide pre-arrangement for, and procurement of, cloud computing resources for which a future requirement is anticipated in accordance with an SLA.

Workloads layer 1290 provides examples of functionality for which the cloud computing environment may be utilized. Examples of workloads and functions which may be provided from this layer include: mapping and navigation 1291; software development and lifecycle management 1292; virtual classroom education delivery 1293; data analytics processing 1294; transaction processing 1295; and assessing conditions and recommending modifications 1296.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for contextualizing searches in a collaborative session having two or more users, comprising:

generating, by a processor, one or more keywords based on an analysis of one or more user context sources of the collaborative session to establish a context of the collaborative session, wherein the one or more user context sources comprise a document, a file, a webpage, a search history, or an application, wherein the one or more keywords are sorted by relevance;

suggesting, by the processor, an additional one or more most relevant keywords to a search string of at least one user, wherein the additional one or more most relevant keywords are suggested based on a relevance score determined for each of the one or more keywords generated from the one or more user context sources, wherein the relevance score generated for each of the one or more keywords is multiplied by a weighting factor when the keyword is derived from a context source associated with an expert user, and wherein the one or more most relevant keywords are added to the search string of the at least one user in response to a user selection of the at least one user;

receiving feedback, by the processor, from the at least one user based on the additional one or more most relevant keywords suggested for the search string of the at least one user;

adjusting, by the processor, the relevance score of the one or more most relevant keywords based on the feedback received from the at least one user, wherein the relevance score is adjusted down for the one or more most relevant keywords rejected by the at least one user; and suggesting, by the processor, an addition of at least one of the one or more most relevant keywords in which the relevance score was adjusted down based on a determination that that the context of the collaborative session has changed.

2. The method of claim 1, wherein each of the users engaged in the collaborative session utilize a computing device, and wherein each computing device is interconnected with each other via a collaborative tool.

3. The method of claim 1, wherein analyzing the data from the one or more user context sources further comprises using a natural language processing system to analyze the one or more user context sources and generate the one or more keywords.

4. The method of claim 1, wherein generating the one or more keywords includes analyzing data from the one or more user context sources, and at least one user is an expert user whose user context source is the only user context source collected and analyzed during the collaborative session.

5. A computer program product for contextualizing searches in a collaborative session having two or more users, comprising:
   a computer-readable storage medium having program instructions embodied therewith, the program instructions executable by a computer to cause the computer to perform a method, comprising:
   generating, by a processor, one or more keywords based on an analysis of one or more user context sources of the collaborative session to establish a context of the collaborative session, wherein the one or more user context sources comprise a document, a file, a webpage, a search history, or an application, wherein the one or more keywords are sorted by relevance;
   suggesting, by the processor, an additional one or more most relevant keywords to a search string of at least one user, wherein the additional one or more most relevant keywords are suggested based on a relevance score determined for each of the one or more keywords generated from the one or more user context sources, wherein the relevance score generated for each of the one or more keywords is multiplied by a weighting factor when the keyword is derived from a context source associated with an expert user, and wherein the one or more most relevant keywords are added to the search string of the at least one user in response to a user selection of the at least one user;
   receiving feedback, by the processor, from the at least one user based on the additional one or more most relevant keywords suggested for the search string of the at least one user;
   adjusting, by the processor, the relevance score of the one or more most relevant keywords based on the feedback received from the at least one user, wherein the relevance score is adjusted down for the one or more most relevant keywords rejected by the at least one user; and
   suggesting, by the processor, an addition of at least one of the one or more most relevant keywords in which the relevance score was adjusted down based on a determination that that the context of the collaborative session has changed.

6. The computer program product of claim 5, wherein each of the users engaged in the collaborative session utilize a computing device, and wherein each computing device is interconnected with each other via a collaborative tool.

7. The computer program product of claim 5, wherein analyzing the data from the one or more user context sources further comprises using a natural language processing system to analyze the one or more user context sources and generate the one or more keywords.

8. The computer program product of claim 5, wherein generating the one or more keywords includes analyzing data from the one or more user context sources, and at least one user is an expert user whose user context source is the only user context source collected and analyzed during the collaborative session.

9. A system for contextualizing searches in a collaborative session having two or more users, comprising:
   a computer system comprising, a processor, a computer readable storage medium, and
   program instructions stored on the computer readable storage medium being executable by the processor to cause the computer system to:
   generating, by a processor, one or more keywords based on an analysis of one or more user context sources of the collaborative session to establish a context of the collaborative session, wherein the one or more user context sources comprise a document, a file, a webpage, a search history, or an application, wherein the one or more keywords are sorted by relevance;
   suggesting, by the processor, an additional one or more most relevant keywords to a search string of at least one user, wherein the additional one or more most relevant keywords are suggested based on a relevance score determined for each of the one or more keywords generated from the one or more user context sources, wherein the relevance score generated for each of the one or more keywords is multiplied by a weighting factor when the keyword is derived from a context source associated with an expert user, and wherein the one or more most relevant keywords are added to the search string of the at least one user in response to a user selection of the at least one user;
   receiving feedback, by the processor, from the at least one user based on the additional one or more most relevant keywords suggested for the search string of the at least one user;
   adjusting, by the processor, the relevance score of the one or more most relevant keywords based on the feedback received from the at least one user, wherein the relevance score is adjusted down for the one or more most relevant keywords rejected by the at least one user; and
   suggesting, by the processor, an addition of at least one of the one or more most relevant keywords in which the relevance score was adjusted down based on a determination that that the context of the collaborative session has changed.

10. The system of claim 9, wherein each of the users engaged in the collaborative session utilize a computing device, and wherein each computing device is interconnected with each other via a collaborative tool.

11. The system of claim 9, wherein analyzing the data from the one or more user context sources further comprises using a natural language processing system to analyze the one or more user context sources and generate the one or more keywords.

12. The system of claim 9, wherein generating the one or more keywords includes analyzing data from the one or more user context sources, and at least one user is an expert user, and wherein the user context source of the expert user is multiplied by a weighing factor when the user context source is analyzed.

* * * * *